(12) United States Patent
Stretton et al.

(10) Patent No.: US 7,313,920 B2
(45) Date of Patent: Jan. 1, 2008

(54) AIRCRAFT ENGINE MOUNTING

(75) Inventors: Richard G Stretton, Loughborough (GB); Ewan F Thompson, Derby (GB)

(73) Assignee: Rolls-Royce plc, London (GB)

( * ) Notice: Subject to any disclaimer, the term of this patent is extended or adjusted under 35 U.S.C. 154(b) by 411 days.

(21) Appl. No.: 11/001,122

(22) Filed: Dec. 2, 2004

(65) Prior Publication Data

US 2005/0230532 A1 Oct. 20, 2005

(30) Foreign Application Priority Data

Dec. 11, 2003 (GB) ................... 0328671.3

(51) Int. Cl.
*F02C 7/20* (2006.01)
(52) U.S. Cl. .......................... 60/797; 60/262
(58) Field of Classification Search ................. 60/797, 60/226.1, 262, 796
See application file for complete search history.

(56) References Cited

U.S. PATENT DOCUMENTS

| | | | | |
|---|---|---|---|---|
| 3,318,554 A | * | 5/1967 | Mullins et al. ............... | 244/54 |
| 3,397,855 A | * | 8/1968 | Newland .................... | 248/554 |
| 3,398,535 A | * | 8/1968 | Hemsworth et al. ........ | 60/226.1 |
| 3,750,983 A | * | 8/1973 | Morris ........................ | 244/54 |
| 3,907,220 A | * | 9/1975 | Amelio ......................... | 244/54 |
| 4,266,741 A | * | 5/1981 | Murphy ....................... | 244/54 |
| 4,603,822 A | * | 8/1986 | Chee ............................ | 244/54 |
| 5,076,049 A | * | 12/1991 | Von Benken et al. ......... | 60/797 |
| 5,428,952 A | * | 7/1995 | Jewess ......................... | 60/796 |
| 5,927,644 A | * | 7/1999 | Ellis et al. .................... | 244/54 |
| 7,083,143 B2 | * | 8/2006 | Whitmer et al. .............. | 244/54 |
| 7,108,224 B2 | * | 9/2006 | Pasquer et al. ............... | 244/54 |

FOREIGN PATENT DOCUMENTS

| | | |
|---|---|---|
| GB | 1 074 068 SP | 6/1967 |
| SU | 849 694 A | 9/1996 |

* cited by examiner

*Primary Examiner*—William H. Rodriguez
(74) *Attorney, Agent, or Firm*—W. Warren Taltavull; Manelli Denison & Selter PLLC

(57) ABSTRACT

An aircraft engine mounting assembly comprising a bracket arrangement with two plates located either side of an opening in the structural bypass duct. The bracket arrangement mounts two inclined links which connect to the engine. In normal usage, tension/compression from the links will be passed by the bracket arrangement into the airframe. Upon failure of one of the links the bracket arrangement will engage with the structural bypass duct to transmit engine loads into the airframe via the duct.

14 Claims, 3 Drawing Sheets

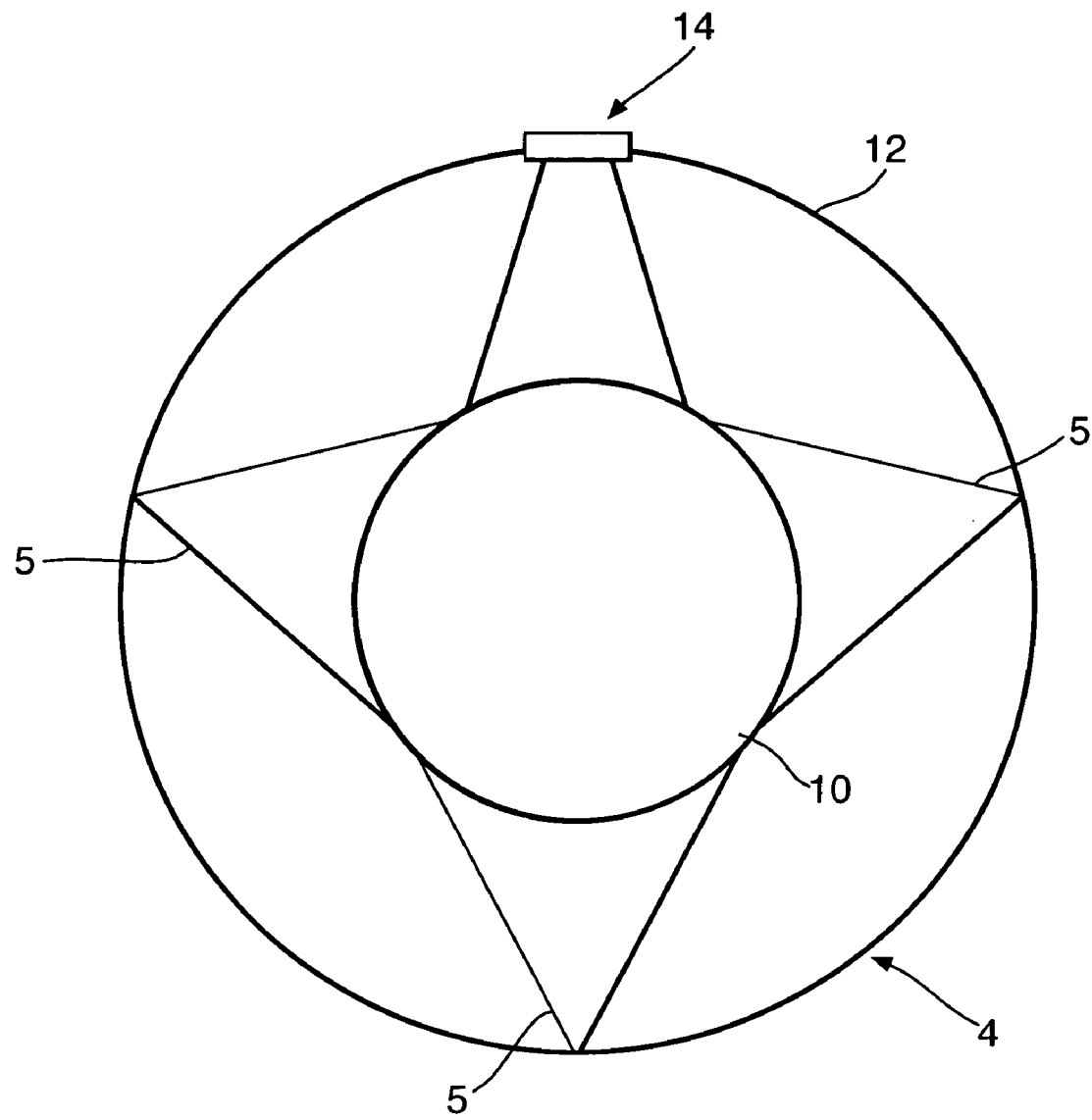

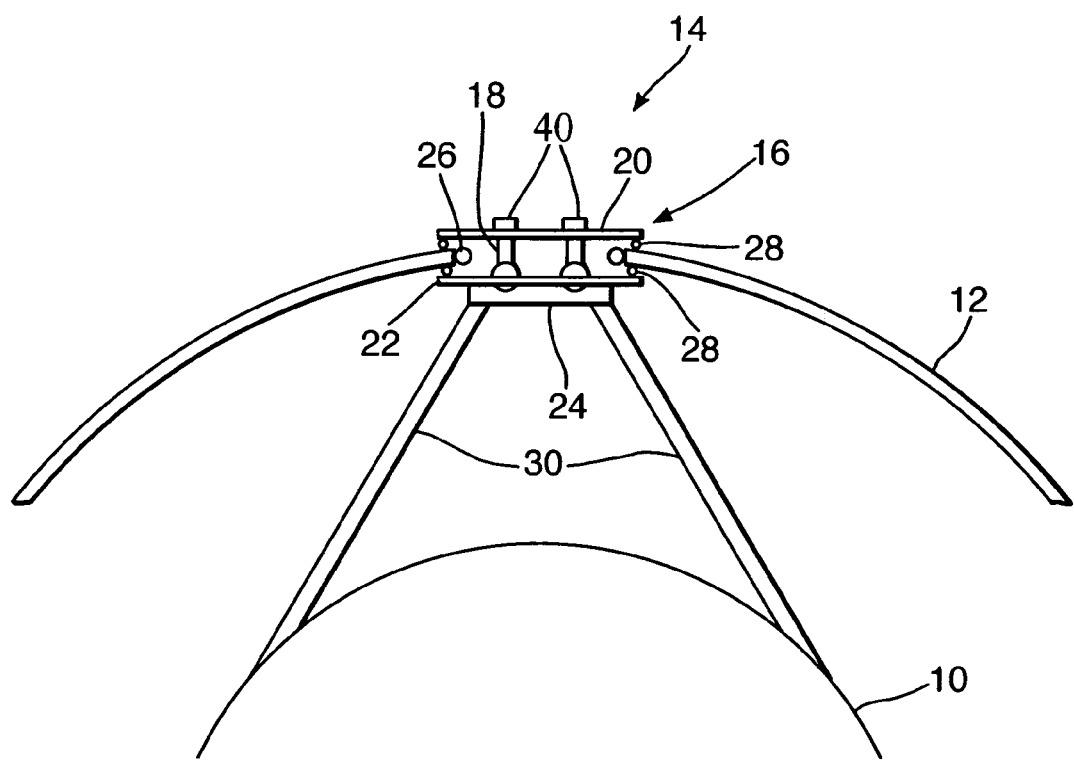

AIRCRAFT ENGINE MOUNTING

FIELD OF THE INVENTION

This invention concerns aircraft engine mounting assemblies, and also gas turbine aircraft engines incorporating such assemblies.

1. Background of the Invention

In high speed aircraft applications it is considered desirable on the engines for the nacelle to be wrapped tightly to the engine case to reduce the drag caused by the nacelle. This can mean that the space to fit a conventional engine mounting between the outer engine duct, i.e. structural bypass duct, and the nacelle is very limited.

With engine mountings it is desirable to provide a "fail-safe" arrangement to permit continued operation in the event of a part of the engine mounting failing in use. Such an arrangement should though have little or no detrimental effect on the engine's performance. One proposal has been to provide an additional link which only becomes load bearing upon the failure of another link. Such an additional link however tends to increase blockage and drag, and thus is detrimental to the engine's performance.

2. Summary of the Invention

According to the present invention there is provided an aircraft engine mounting assembly, the assembly including a pair of inclined links extending from spaced locations on the engine core casing to a bracket arrangement located on the structural bypass duct, the bracket arrangement being configured such that in normal operation said arrangement does not substantially engage with the structural bypass duct and transmits engine loads directly into the airframe, but upon a failure of part of the engine mounting the bracket arrangement will engage with the structural bypass duct to transmit engine loads into the airframe via the structural bypass duct.

The bracket arrangement preferably locates in an opening in the structural bypass duct. The bracket arrangement preferably includes a first part located on the exterior of the structural bypass duct and overlapping the structural bypass duct around the opening. The bracket arrangement may also include a second part located on the interior of the structural bypass duct and overlapping the structural bypass duct around the opening. The mounting assembly is preferably arranged such that the first and second parts substantially only transmit loads to the structural bypass duct following a failure of part of the engine mounting.

Seals may be provided between the first part and the structural bypass duct, and/or the second part and the structural bypass duct.

The first and/or second parts may be in the form of plates. A body may extend between the first and second parts, which body mounts the respective ends of the links. A seal may be provided around the body and engageable with the edge of the opening in the structural bypass duct.

The first part may be releasably mounted on the body whereby to facilitate engine removal.

The assembly is preferably provided towards the rear of the engine.

The invention also provides a gas turbine engine mounting arrangement, the arrangement including at least one assembly according to any of the preceding six paragraphs.

The gas turbine engine mounting arrangement may also include a plurality of link assemblies extending between the engine core casing and the structural bypass duct. The link assemblies and the mounting assemblies may be substantially equispaced around the engine, and three link assemblies and one mounting assembly may be provided.

BRIEF DESCRIPTION OF THE DRAWINGS

An embodiment of the present invention will now be described by way of example only and with reference to the accompanying drawings, in which

FIG. 2 is a schematic sectional view on the line A-A of FIG. 1; and

FIG. 3 is a diagrammatic view in a similar direction to FIG. 2 of a part of the aircraft of FIG. 1.

DETAILED DESCRIPTION OF THE INVENTION

Figure 1:
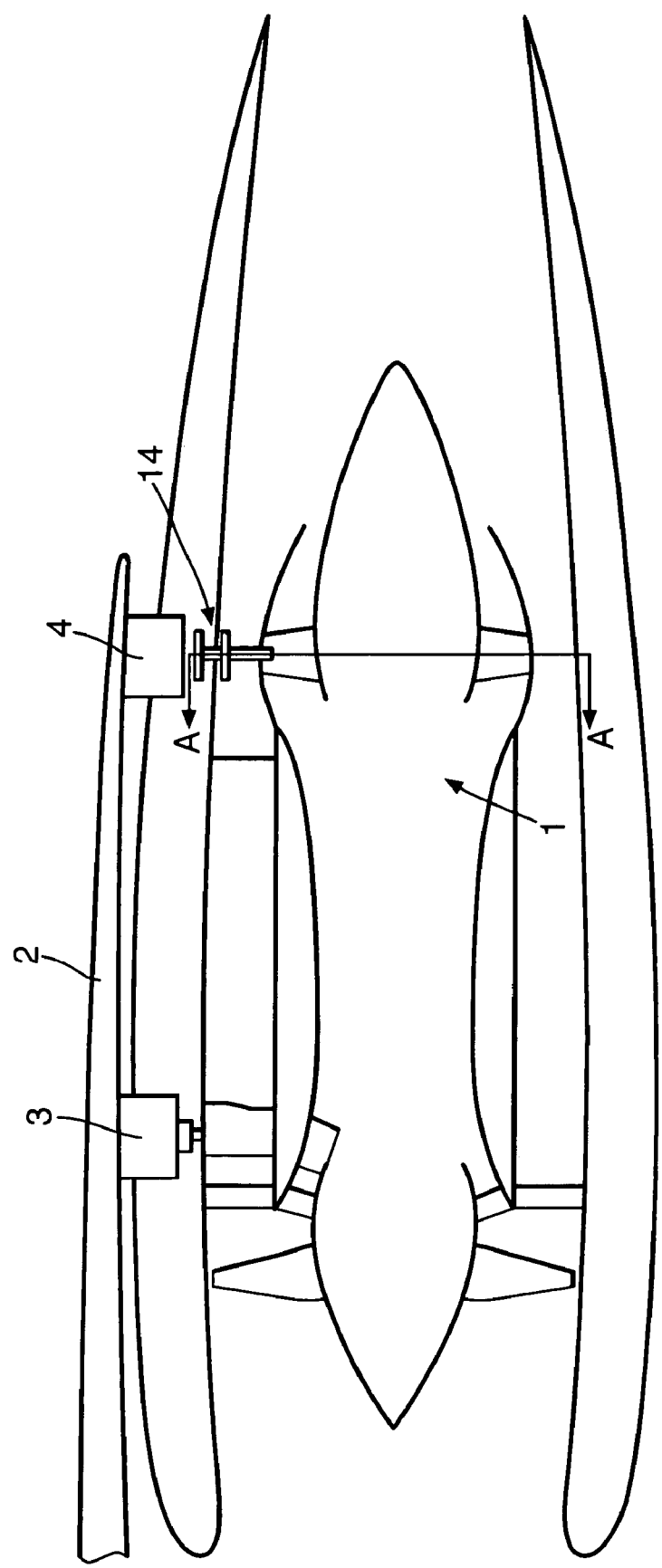
FIG. 1 is a diagrammatic sectional side view of part of an aircraft showing mounting of a gas turbine engine on the aircraft.

FIG. 1 shows the mounting of a gas turbine engine 1 under a wing 2 of an aircraft. A front mounting plane 3 and a rear mounting plane 4 are provided. FIG. 2 illustrates the rear mounting plane 4 with the engine core casing in the form of a tail bearing housing 10 being mounted to and spaced from the structural bypass duct 12 by three link assemblies 5 and an engine mounting assembly 14 according to the invention. The assemblies 5, 14 are equispaced around the housing 10, with the assembly 14 immediately beneath the wing 2.

FIG. 3 shows the engine mounting assembly 14 including a bracket arrangement 16 which locates in an opening 18 provided in the duct 12. The arrangement 16 comprises a first part in the form of an exterior plate 20 which is located on the exterior of the duct 12 so as to overlap the edges of the opening 18. A second part in the form of an interior plate 22 is provided on the interior of the duct 12 again overlapping the edges of the opening 18. The arrangement 16 also comprises a body 24 extending between the plates 20, 22 through the opening 18 and a little below the interior plate 22. A seal 26 is provided between the body 24 and the edge of the opening 18. Further seals 28 are provided between the plates 20, 22 adjacent their perimeter and the duct 12. Bolts 40 are provided around the exterior plate 20 to the body 24 and are removable to readily permit removal of the engine.

A pair of links 30 extend from the body 24 in an A-frame arrangement to spaced locations on the tail bearing housing 10. The links 30 are mounted so as to permit movement relative to the housing 10 and body 24. The opening 18 provides sufficient clearance for relative motions due to thermal growth or load induced deflections during normal operation.

In normal usage, engine loads, whether side or vertical loads, would be carried by the links 30 to the body 24, and the body 24 would interface with the airframe (not shown). The plates 20,22 would substantially not transmit forces to the duct 12, and the seals 26,28 retain the pressure differential across the duct 12.

In the event of a failure of the engine mounting such as for example one of the links 30, whether within its length or at one of its mountings, the load would then be transmitted at least in part onto the duct 12, by virtue of engagement of the plates 20,22 on the duct 12 around the opening 18.

Vertical loads are reacted via the plates 20 and 22, with side loads reacting by contact of the body 24 with shoulders in the opening 18. Axial clearance between the body 24 and the opening 18 requires to be sufficient to avoid transmission of thrust loads in this failure case.

The bypass duct 12 is kept concentric to the engine core casing by means of the link assemblies 5 such that in the event of an engine mounting failure such as a failed link, any engine loads are passed via the link assemblies 5 into the structural bypass duct 12, and then via the body 24 to the airframe.

Also, in the event of failure of the engine mounting such as any thrust link for example at the front mounting plane 3, the body 24 could be utilised as a failsafe catcher for engine thrust loads, whether or not the remainder of the rear mounting plane 4 is in its usual unfailed condition.

There is thus described an engine mounting which in normal use operates in a conventional manner and does not cause any particular detriment to the operation of the engine, for instance by providing extra components extending into the space between the duct 12 and housing 10. In the event of a failure of one of the links, load is automatically borne by the structural bypass duct 12 until an appropriate repair can be carried out. Whilst providing for effective and reliable operation, the assembly is of relatively simple construction, and readily permits removal of the engine.

Various modifications may be made without departing from the scope of the invention. For instance, a different number of such assemblies could be used. A different arrangement could be provided for enabling the automatic engagement with the structural bypass duct in the event of a failure of one of the links.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. An aircraft engine having a structural bypass duct, a core engine casing and a mounting assembly, the assembly including a pair of inclined links extending from spaced locations on the engine core casing to a bracket arrangement located on the structural bypass duct wherein there is a clearance between the bracket arrangement and the duct and said bracket arrangement is configured such that in normal operation said bracket arrangement transmits engine loads directly into the aircraft without transmitting said engine loads through the structural bypass duct, but upon failure of part of the engine mounting, the bracket arrangement engages with the structural bypass duct to transmit engine loads into the aircraft via the structural bypass duct characterised in that the bracket arrangement locates in an opening in the structural bypass duct.

2. An assembly according to claim 1 characterised in that the bracket arrangement includes a first part and a second part, said first part being located on the exterior of the structural bypass duct and overlapping the structural bypass duct around the opening.

3. An assembly according to claim 2, characterised in that the mounting assembly is arranged such that the first and second parts substantially only transmit loads to the structural bypass duct following a failure of part of the engine mounting.

4. An assembly according to claim 2, characterised in that seals are provided between the first part and the structural bypass duct, and/or the second part and the structural bypass duct.

5. An assembly according to claim 2, characterised in that the first and/or second parts are in the form of plates.

6. An assembly according to claim 2, characterised in that a body extends between the first and second parts, which body mounts the respective ends of the links.

7. An assembly according to claim 6, characterised in that a seal is provided around the body and engageable with the edge of the opening in the structural bypass duct.

8. An assembly according to claim 6, characterised in that the first part is releasable mounted on the body whereby to facilitate engine removal.

9. An assembly according to claim 1, characterised in that the assembly is provided towards the rear of the engine.

10. A gas turbine aircraft engine mounting arrangement, characterised in that the arrangement includes at least one assembly according to claim 1.

11. An engine according to claim 10, characterised in that the arrangement also includes a plurality of link assemblies extending between the engine core casing and the structural bypass duct.

12. An arrangement according to claim 11, characterised in that the link assemblies and mounting assembly are equispaced around the engine.

13. An arrangement according to claim 11, characterised in that three link assemblies and one mounting assembly are provided.

14. An aircraft engine mounting assembly, the assembly including a pair of inclined links extending from spaced locations on the engine core casing to a bracket arrangement located in an opening in the structural bypass duct characterised in that the bracket arrangement is configured such that in normal operation said arrangement does not substantially engage with the structural bypass duct and transmits engine loads directly into the aircraft, but upon failure of part of the engine mounting the bracket arrangement will engage with the structural bypass duct to transmit engine loads into the aircraft via the structural bypass duct, characterised in that the bracket arrangement includes a second part located on the interior of the structural bypass duct and overlapping the structural bypass duct around the opening.

* * * * *